3,061,602
Patented Oct. 30, 1962

3,061,602
POLYMERIZATION CATALYSTS AND PROCESSES THEREFOR
Edward William Duck, Sale Moor, and Kenneth Leonard Fletcher, Bury, England, assignors to Shell Oil Company, a corporation of Delaware
No Drawing. Filed Dec. 2, 1957, Ser. No. 699,940
Claims priority, application Great Britain Dec. 4, 1956
13 Claims. (Cl. 260—94.9)

This invention relates to improved catalysts and methods for the polymerization of alpha-olefins. More particularly, this invention relates to improved methods for the low pressure polymerization of alpha-olefins, such as ethylene, whereby the quality of the product is more readily controlled.

It is now well known that polymers of alpha-olefins may be prepared at low temperatures and pressures in the presence of certain catalyst compositions. Such processes are conducted at temperatures ranging from about ambient temperatures to about 120° C. and pressures below 500 p.s.i., and usually a pressure in the order of 3–5 atmospheres. The catalysts are designated in the art generally as "Ziegler catalysts" or "low pressure catalysts." Such catalysts are capable of polymerizing alpha-olefins, as ethylene, butene-1, propylene, styrene and other alpha-olefins. The process of the present invention relates to improved methods of producing polyethylene, polypropylene, polystyrene, and other polymers and copolymers of alpha-olefins using the low pressure methods. As the technology relating to the polymerization of alpha-olefins by the use of the low pressure catalysts is substantially the same, this invention will be described as it relates to the production of certain homopolymers but it will be readily understood that the invention is of general application to the polymerization of alpha-olefins and copolymers thereof using the low pressure catalysts and low pressure methods.

Representative "low pressure" catalysts may be selected, for example, from A through C as follows:

A. The reaction product of (1) a compound of a metal selected from Groups IV, V, VI and VIII of the Mendeleeff Periodic Table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan thiophenol, carboxylic acid and sulfonic acid, B. The reaction product of (1) a compound of a metal from Groups IV, V, VI and VIII of the Mendeleeff Periodic Table and manganese with (2) a compound selected from the group consisting of aluminum trialkyl, magnesium alkyl, zinc alkyl and Grignard compound, C. A composition comprising aluminum trichloride, titanium tetrachloride, and aluminum.

Briefly, the low pressure polymerization processes comprise bringing into admixture any of the low pressure catalysts, together with an alpha-olefin as ethylene. If elevated temperatures and pressures are to be employed, then the reaction vessel is equipped with suitable inlets, outlets, pressure gauges, heating and cooling means, and the like. The catalyst compositions are most conveniently prepared by merely mixing the catalyst component in an inert hydrocarbon solvent. The thus formed catalyst slurry is then added to the polymerization vessel. As it relates to a catalyst composition prepared from say, aluminum diethyl chloride and titanium tetrachloride, the two ingredients may be added separately to a suitable vessel containing an inert hydrocarbon such as pentane, hexane, isobutane, benzene, toluene, and the like. If desired, the components may be mixed in a separate vessel in the presence of the solvent whereupon there is formed a dark precipitate which constitutes the catalyst composition. The dark precipitate, which may range from a brown to a black-like color, may be separated from the hydrocarbon slurry before it is added to the reaction vessel. However, it is advantageous to merely add the hydrocarbon solvent containing the catalyst in slurry directly to the polymerization vessel. After the polymerization is complete the polymerization products are withdrawn from the reaction vessel. The polymerization product comprises a mixture of the polymer, such as polyethylene, hydrocarbon solvent, catalyst and catalyst remanents. At this stage of the process, the polymer is characterized by a dark color which is attributed to the presence of catalyst residues. Accordingly, it is conventional to wash the polymer with a lower alcohol such as methanol, butanol or the like, whereupon a reaction occurs whereby the catalyst remanents are solubilized. Thereafter a simple filtration separates the alcoholic solution of the catalyst remanents from the polymer.

One of the more difficult problems in conjunction with the low pressure methods for the polymerization of alpha-olefins is that of molecular weight control. It is known that in the polymerization of olefins, as ethylene, the molecular weight of the polymer produced may be varied according to the ratio of the catalyst-forming components employed to form the catalyst mixture. Thus, when an aluminum alkyl, or aluminum alkyl halide, is used with a titanium compound, the molecular weight of the polymer increases with an increasing molar ratio of aluminum to titanium. There are, however, reasons connected with the yield and the rate of reaction why this effect cannot be used to obtain molecular weights as high as is sometimes desirable. The problem of controlling molecular weight also arises when using highly purified olefins and solvent. By similar processing techniques such matters as yield per unit of catalyst, density of the polymer, etc. may be influenced.

It is an object of this invention to provide improvements in the low pressure methods for the polymerization of alpha-olefins. It is another object of this invention to provide novel catalyst for the low pressure polymerizations of alpha-olefins. It is yet another object of this invention to provide a novel catalyst for the low pressure polymerizations of alpha-olefins which will permit the yields and molecular weights of low pressure polymer to be influenced and controlled. Other objects will become apparent as the description of the invention proceeds.

These and other objects are accomplished in the process for the polymerization of alpha-olefins at temperatures below 150° C. and pressure below 500 p.s.i.g., the polymerization being conducted in the presence of a low pressure catalyst by the improvement which comprises conducting the polymerization in the presence of an added metal alcoholate of the formula $M(OR)_mR_n$ wherein M is selected from the group consisting of a metal within Groups IV to VIII of the Periodic Table, the R's are hydrocarbyl radicals, m is an integer, and n is zero or an integer, the sum of m and n equalling the valence of M. The catalyst system is a novel composition of matter which affords the processing advantages which will be described hereinafter. By another embodiment of this invention the low pressure polymerization processes are conducted in the presence of a minor amount of an alcohol which is present during the course of the polymerization.

The metal for the alcoholate can be any metal within Groups IV–VIII of the Periodic Table which will form alcoholates. Particularly preferred are the metals of Group IV with titanium being particularly preferred. The alcoholate may be derived from a primary, secondary or tertiary alcohol including monohydric or polyhydric alcohols. They may also be derived from monohydric or polyhydric phenols. In actual practice, the preference for the alcoholate may be based largely on cost considerations but in a particularly preferred embodiment R is derived from a lower aliphatic primary alcohol so that the alcoholate is more readily soluble in the reaction medium. The reaction medium usually comprises a suspension of the low pressure catalyst in an unreactive solvent such as isooctane, heptane, benzene, toluene or the like. If desired, however, a metal alkoxide may be employed which is less soluble and forms a suspension in said reaction medium, and they are preferred in some cases. Thus the alcoholate may be derived from higher alcohols. In another preferred embodiment, the R's are all the same because they are easier to prepare and for the same reason the most preferred species of alcoholate are those wherein $n$ in the above formula is zero and the R's are the same.

The preparation of the oxygen-containing organo-metallic compounds used in carrying out the present invention forms no essential feature thereof and accordingly the present invention is in no way limited to any particular method for preparing the alcoholates. Thus conventional methods can be employed depending for example on the availability of starting materials. Examples of alcoholates of metal from Groups IV–VIII of the Periodic Table include alkoxides as the methoxides, ethoxides and n-butoxides and others up to and including octanolates, nonanolates, decanolates, and alkoxides derived from higher alcohols than decanol. Particular species of the oxygen-containing organo-metallic compounds which can be mentioned in this connection include zirconium tetra-ethoxide, zirconium tetra-methoxide and zirconium tetra-isopropoxide, hafnium tetra-methoxide, thorium tetra-isopropoxide, titanium tetra-nonanolate, bismuth ethoxide, cobalt methoxide, titanium tetraphenylate, and the like. These compounds are mentioned by way of example and the present invention is in no way limited thereto. In practice ready availability will generally influence the choice of a particular oxygen-containing organo-metallic compound in carrying out the present invention, other considerations being equal. For example, the titanium alkoxides can be readily prepared and will often be preferred for that reason.

The process of the present invention are suitable for the polymerization of alpha-olefins in general. It is particularly suitable for the polymerization of lower alpha-olefins as ethylene, propylene, butene-1, and the like. This is because the polymerization of the lower alpha-olefins proceeds more rapidly with higher conversions. Further, the polymers of ethylene and propylene are more useful but this does not constittue a limitation to the present invention and if desired two or more alpha-olefins may be copolymerized. Although the process of this invention affords greater advantages for the polymerization of lower alpha-olefins, higher olefins may be polymerized to produce useful products. Thus, for example, styrene may be polymerized alone or with other monomers.

The quantities of oxygen-containing organo-metallic compounds required in carrying out the present invention will usually depend on the particular manner in which it is desired to influence polymerization and also on the polymerization conditions employed such for example as the nature of the catalyst, the catalyst ratio and the polymerization temperature. In general the amount employed will range from about .01 to about 30 millimoles of the alcoholate per 10 millimoles of the total low pressure catalyst. Good results have also been obtained by effecting the polymerization of ethylene in the presence of a low pressure catalyst (such as that formed by mixing aluminum diethyl monochloride or aluminum triethyl or triisobutyl with titanium tetrachloride) and titanium tetra-nonanolate, the latter being added for example in the proportion of between 5 and 30 millimoles per 100 millimoles of total catalyst-forming components. With these amounts of added titanium nonanolate it has been found that the yield of the desired polyethylene and the rate of polymerization may be appreciably increased. It is also found that the bulk density and the molecular weight of the resulting polyethylene can be increased. With other alcoholates and/or catalysts the amount of the alcoholate will be different.

As previously indicated, the present invention may be conducted not only in the presence of an oxygen-containing organo-metallic compound, but also in the presence of an alcohol. The alcohol may be selected from those which are either normally liquid or solid since it will be in solution during the reaction. In the preferred embodiment the alcohol, which may be optionally employed, is selected to correspond to that of the alcoholate, although it is not essential that such be the case. Thus for example if the metal alcoholate is titanium nonanolate then the alcohol may advantageously be nonanol. In a similar manner if the alcoholate is derived from phenol then the alcohol may advantageously be selected from phenol or cresol. The presence of both the alcoholate and the alcohol may afford substantial advantages although the use of the alcohol is optional. Thus molecular weight and/or yields may be controlled with greater ease. This will be shown in greater detail in the examples. Further, internal fouling of the polymerization reactor which otherwise occurs as a result of build-up of polyolefin on the internal surfaces thereof is reduced. This reduction in fouling is aided by the presence of both the alcoholate and the alcohol. Persons skilled in this art will readily appreciate that the reduction in fouling is a substantial advantage afforded by the present invention, particularly as it relates to continuous methods of operation although the improvements of the present invention are also suitable for batch operations.

In carrying out the improvements of the present invention it is convenient to add the alcoholate directly to the reaction medium and if the process is carried out continuously such addition may be continuous or intermittent during the course of the polymerization, the alcoholate being dissolved or dispersed in an unreactive solvent such as the solvent used in the polymerization. When an alcohol is to be present also it may be added together with the alcoholate or, if it is sufficiently volatile, it may be added to the alpha-olefin feed. In the case of continuous operations when an alcohol is used, the alcoholate together with the alcohol may be added to fresh solvent which is supplied during the course of polymerization. In some circumstances it may be more convenient to add the alcoholate to fresh catalyst which is supplied during the polymerization.

As previously indicated, the present invention is particularly directed to improvements in the prior art methods for the low pressure polymerization of alpha-olefins. Such methods comprise conducting the polymerization at temperatures below about 150° C. and pressure below 500 p.s.i.g. Normally however, temperatures range from about 30° C. to about 100° C. and pressures in the order of about 5–25 p.s.i.g. The low pressure catalyst is formed by merely mixing the catalyst components in a solvent as isooctane, benzene, toluene or other hydrocarbons or chlorinated hydrocarbons. The mixture may be allowed to age for a short period whereupon there is formed a solid suspension in the solvent. In the preferred embodiment the low pressure catalyst is prepared from an aluminum trialkyl or an aluminum dialkyl halide and a titanium salt, particularly a titanium chloride.

When an alcoholate and an alcohol are added for the purpose of increasing the molecular weight (and in some cases also the bulk density) of the resulting polymer, the total amount of alcoholate and alcohol added is conveniently between 0.001 and 10 molar percent, and preferably between 0.002 and 1 molar percent, of the olefin which is polymerized. When using a low pressure catalyst formed by mixing, for example, aluminum diethyl monochloride and titanium tetrachloride as the catalyst-forming components and, after allowing the mixture to age for a short period (e.g. ½ to 1 hour), suspending the resulting catalyst in a solvent such as isooctane, benzene or a light petroleum distillate boiling between 90–110° C., each catalyst-forming component being present to the extent of 0.5 to 20 millimoles and preferably about 5 millimoles per liter of the resulting suspension (with an Al:Ti molar ratio of about 1), the amount of alcoholate and alcohol (when present) is preferably between 0.05 and 2.0 millimoles per millimole of aluminum or titanium.

In the preferred procedure, the catalyst is prepared from an aluminum alkyl and a titanium salt. The aluminum compound preferably contains alkyl radicals of 1 to 10 carbon atoms and includes for example aluminum trimethyl, aluminum triethyl, aluminum triisopropyl, aluminum triisoctyl, aluminum diethyl chloride, aluminum diisopropyl bromide, and the like. The titanium compound is preferably a titanium halide such as titanium tetrachloride, titanium tetrabromide, titanium trichloride and the like.

It is known that the low pressure polymerization processes are capable of producing products having a variety of physical properties by reason of the numerous variables which are involved. Thus although one may use a technical grade olefin as the feed it is generally preferred to use a very pure alpha-olefin and also very pure catalyst forming component as well as pure optional components of the polymerization reaction mixture such as the alcohol. The olefin, or mixture of olefins in the event that copolymers are to be prepared, should be as free as practical of other unsaturated hydrocarbons and also free of any non-hydrocarbon organic compounds. The same considerations apply broadly to the optional components such as the alcohol. In view of the numerous variables which may affect the overall processes and products it will be found to be desirable to first conduct the processes of the present invention on a small scale whereby the effect of such variables as the catalyst, alcohol (if used), alcoholate and their relative proportions may be determined. Once these factors have been determined on a small scale then one may proceed on a larger scale. Thus, for example, the polymerization of propylene normally requires slightly higher temperatures with one of the preferred catalysts components being titanium trichloride. Further, for propylene polymerizations best results are obtained when the aluminum to titanium ratio is in excess of 1 and more preferably about 2.5 to 1.

The invention will be described in greater detail in the following examples:

Example I

Ethylene is polymerized batchwide in a reaction medium comprising a suspension in isooctane of a catalyst prepared by mixing solutions of aluminum diethyl monochloride and titanium tetrachloride in isooctane (concentrations 100 millimoles per liter) in the presence of a further small quantity of isooctane and passing the resulting mixture (concentration 50 millimoles per liter) through a screw-conveyor so as to age the mixture at 40° C. to 20 minutes prior to being added to the polymerization vessel in which it is mixed with the bulk of the isooctane employed as the solvent in the process. Ethylene is introduced continuously into the reaction medium which is maintained at 40° C. and vigorously stirred during polymerization, the duration of which is 2 hours in each case. The catalyst concentration in the reaction medium corresponds to 5 millimoles per liter of each of the catalyst-forming components. At the end of polymerization the reaction mixture containing the polymer product and the catalyst materials suspended in the isooctane solvent is worked-up to decompose the catalyst by treatment with methanol and to separate and purify the polymer by washing with alcohol and drying the washed polymer. In accordance with the present invention polymerization is effected in the presence of 1.5 millimoles per liter of titanium tetra-n-butoxide and gives 14 parts by weight of polyethylene having an intrinsic viscosity of 10.6. By way of comparison a second run is made in the absence of the alkoxide but under otherwise identical conditions. The polymer obtained in the second run has an intrinsic viscosity of 4.0. In a further run in which polymerization is carried out in the presence of only 0.5 millimole per liter of titanium tetra-n-butoxide 16 parts by weight of a polyethylene of I.V. 7.3 is obtained. The conditions of this run are in other respects the same as in the first run.

Example II

Ethylene is polymerized in the manner indicated in Example I in the presence of 1.5 millimoles per liter of zirconium tetra-lauroxide using a catalyst prepared as indicated above. The yield of polymer is 20 parts by weight, and the intrinsic viscosity of the polymer is 1.62.

Examples III–V

Ethylene is polymerized continuously in a reaction medium comprising a suspension, in a light hydrocarbon fraction, of a low pressure catalyst prepared as described in Example I. In accordance with the present invention titanium tetra-nonanolate is added to the reaction medium. Ethylene is introduced continuously into the reaction medium, the polymerization conditions also being as described in Example I and slurried reaction mixture is withdrawn continuously and worked-up to decompose the catalyst and to separate the polymer. The results of two separate runs carried out in this manner are given in the following table, together with the results of a comparative run:

| Example | Concentration of Nonanolate (millimoles/liter) | Concentration of Aluminum Compound in Reactor (millimoles/liter) | Residence Time, Hrs. | Ethylene Adsorption Rate (Grams/liter/hour) | Polymer Product Properties | | |
|---|---|---|---|---|---|---|---|
| | | | | | Softening Point, 30° Angle, ° C. | IV | Impact Strength (ft. lb./in. notch) |
| III | 0 | 5 | 5 | 9.0 | 115.5 | 1.6 | 1.0 |
| IV | 2.0 | 4 | 3.8 | 72.0 | 119.5 | 3.3 | 5.0 |
| V | 1.0 | 6 | 5.5 | 27.5 | 115.5 | 2.4 | 3.8 |

Example VI

The procedure of Example I is repeated except that about 3 millimoles of butanol are added to the reaction mixture. The ethylene absorption rate is increased and the polymer has a higher intrinsic viscosity.

Example VII

The procedure of Example II is repeated except that lauryl alcohol is added. No substantial increase in ethylene absorption rate or intrinsic viscosity is observed but the product has a slightly higher bulk density.

Example VIII

In separate experiments the above procedure are repeated using zirconium tetra-methoxide, thorium tetra-isopropoxide and manganese ethoxide. In all cases improvements are observed either in the intrinsic viscosity or the density. With the zirconium tetra-methoxide, however, improved ethylene absorption rates are also obtained.

Example IX

The procedures of Examples I and II are repeated in separate experiments except that propylene is polymerized with a catalyst prepared from aluminum diethyl chloride and titanium trichloride so that the Al:Ti mole ratio is 2.5:1. In these experiments it is observed that the polymer shows improved intrinsic viscosity and higher yields.

From the foregoing it will be observed that numerous modifications of the present invention may be undertaken without departing from the spirit of this invention. Thus, for example, it is not necessary to operate in a continuous manner and the invention may be carried out in batch operations. Furthermore, it will be readily appreciated that the working-up process may include other techniques which are known in the art in order to reduce the catalyst residues which remain in the polymer.

We claim as our invention:

1. The reaction product consisting essentially of an aluminum alkyl and a titanium halide reacted with a metal alcoholate of the formula $M(OR)_mR_n$ wherein M is selected from the group consisting of a transition metal in Groups IV–VI of the Mendeleeff Periodic Table, the R's are aliphatic hydrocarbon radicals, $m$ is a positive number and $n$ is selected from zero and a positive whole number, the sum of $m+n$ being equal to the valence of M, the metal alcoholate being reacted with the said reaction product is an amount ranging from about .01 to about 30 millimoles for about 10 to about 100 millimoles.

2. The product of claim 1 wherein M is titanium.

3. The product of claim 1 wherein the metal alcoholate is titanium alkoxide.

4. A composition consisting essentially of the reaction product of a titanium chloride and aluminum diethyl chloride, and a titanium alcoholate of the formula $Ti(OR)_4$ in which R is an aliphatic radical of 1 to 10 carbon atoms, the alcoholate being reacted with the said reaction product in an amount ranging from .01 to about 30 millimoles for about 10 to about 100 millimoles, respectively.

5. The composition of claim 4 in which $Ti(OR)_4$ is titanium tetra-nonanolate.

6. A composition consisting essentially of the reaction product of a titanium chloride and aluminum triethyl and a metal alcoholate of the formula $Ti(OR)_4$ in which R is an aliphatic radical of 1 to 10 carbon atoms, the alcoholate being reacted with said reaction product in an amount ranging from .01 to about 30 millimoles for about 10 to about 100 millimoles, respectively.

7. The composition of claim 6 in which $Ti(OR)_4$ is titanium tetra-nonanolate.

8. In the process for polymerizing a mono-alpha-olefin at temperatures below 150° C. and pressures below 500 p.s.i. with a catalyst of an aluminum alkyl-titanium halide reaction product, the improvement which consists essentially of conducting the polymerization in the added presence of a metal alcoholate of the formula $M(OR)_mR_n$ wherein M is selected from the group consisting of a transition metal in Groups IV–VI of the Mendeleeff Periodic Table, the R's are aliphatic hydrocarbon radicals, $m$ is a positive whole number and $n$ is selected from zero and a positive number, the sum of $m+n$ being equal to the valence of M, the metal alcoholate being reacted with the said reaction product in an amount ranging from about .01 to about 30 millimoles for about 10 to about 100 millimoles.

9. The improvement of claim 8 in which M is titanium.

10. The improvement of claim 8 in which the alpha-olefin is ethylene.

11. In the process for the polymerization of an alpha-olefin at temperatures below 150° C. and pressures below 500 p.s.i., the improvement which comprises conducting the polymerization in the presence of a composition consisting essentially of the reaction product of titanium tetrachloride and aluminum diethyl chloride, and a titanium alcoholate of the formula $Ti(OR)_4$ in which R is an aliphatic radical of 1 to 10 carbon atoms, the alcoholate being reacted with the said reaction product in an amount ranging from .01 to about 30 millimoles for about 10 to about 100 millimoles, respectively.

12. The improvement of claim 11 in which $Ti(OR)_4$ is titanium tetranonolate.

13. In the process for polymerizing a mono-alpha-olefin at temperatures below 150° C. and pressures below 500 p.s.i. with a catalyst of an aluminum alkyl-titanium halide reaction product, the improvement which consists essentially of conducting the polymerization in the added presence of a minor portion of added alcohol and added metal alcoholate of the formula $M(OR)_mR_n$ wherein M is selected from the group consisting of a transition metal in Groups IV–VI of the Mendeleeff Periodic Table, the R's are aliphatic hydrocarbon radicals, $m$ is a positive whole number and $n$ is selected from zero in a positive number, the sum of $m+n$ being equal to the valence of M, the total amount of the alcohol and the alcoholate being between 0.001 and 10 mole percent of the mono-alpha-olefin.

References Cited in the file of this patent

UNITED STATES PATENTS

| | | |
|---|---|---|
| 2,827,445 | Bartolomeo et al. | Mar. 18, 1958 |
| 2,846,427 | Findlay | Aug. 5, 1958 |
| 2,886,561 | Reynolds et al. | May 12, 1959 |
| 2,965,626 | Pilar et al. | Dec. 20, 1960 |

FOREIGN PATENTS

| | | |
|---|---|---|
| 534,792 | Belgium | Jan. 31, 1955 |
| 540,459 | Belgium | Aug. 31, 1955 |